UNITED STATES PATENT OFFICE.

WALTER KÖNIG, OF DRESDEN, GERMANY, ASSIGNOR TO FARBENFABRIKEN VORM. FRIEDR. BAYER & CO., OF ELBERFELD, GERMANY, A CORPORATION OF GERMANY.

RED DYE.

No. 913,513.　　　Specification of Letters Patent.　　　Patented Feb. 23, 1909.

Application filed November 30, 1908. Serial No. 465,102.

*To all whom it may concern:*

Be it known that I, Walter König, doctor of technical arts, chemist, citizen of the German Empire, residing at Dresden, Saxony, Germany, have invented new and useful Improvements in new Red Dyes, of which the following is a specification.

My invention relates to the manufacture and production of new red to violet basic dyestuffs which apart from their great coloring power are remarkable for their very clear shades fast to washing and to light. They can be dyed on tanned cotton and are reddish products soluble in hot water with a red color.

The process for their production consists in treating salts of dinitrophenylpyridiniums with dihydroindols, especially dihydroindol and its substitution products. The same dyestuffs are obtained on starting from cyanpyridiniums or from pyridins and cyanogen halogenids.

In order to illustrate the new process more fully the following example is given, the parts being by weight: In a flask provided with a reflux condenser 28.15 parts of 2.4-dinitrophenylpyridinium chlorid

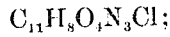

(*Annalen* 333, p. 296) are heated on the water bath for about 4 hours with 60 parts of methyl or ethyl alcohol and 26.6 parts of dihydro-alpha-methylindol

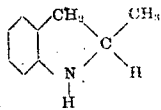

(see *Berichte der Deutschen Chemischen Gesellschaft* 14, p. 883). The crimson red solution is then poured into an excess of highly diluted hydrochloric acid. The new dyestuff is thus precipitated in the shape of a pulpy red mass which contains the greater part of the dinitranilin split off during the reaction. The mixture is filtered off with suction and is extracted with hot water to dissolve the dye. From the resulting red solution the dyestuff is precipitated by the addition of hydrochloric acid or common salt. It forms after being dried microscopic brownish-red needles having a blue luster which are easily soluble in alcohol, and in hot water with a red color. It dyes tanned cotton red shades resembling those of rhodamin 6G but they are clearer and faster to light.

Other substitution products of dihydroindol or dihydroindol itself may be used.

Having now described my invention and in what manner the same is to be performed, what I claim as new and desire to secure by Letters Patent is:—

1. The herein-described new basic dyestuffs obtainable from salts of dinitrophenylpyridinium and dihydroindols, especially dihydroindol and its substitution products, which dyes are reddish products soluble in hot water with a red color, and dyeing tanned cotton from red to violet shades, substantially as described.

2. The herein-described new basic dyestuff obtainable from 2.4-dinitrophenylpyridinium chlorid and dihydro-alpha-methylindol, which forms after being dried microscopic brownish-red needles, which are easily soluble in hot water with a red color and easily soluble in alcohol with a red color and which dye tanned cotton red shades, substantially as described.

In testimony whereof I have hereunto set my hand in the presence of two subscribing witnesses.

WALTER KÖNIG.

Witnesses:
　Rudolf Schreckenbach,
　Richard Hofmann.